United States Patent
Kallesøe

(10) Patent No.: US 11,243,512 B2
(45) Date of Patent: Feb. 8, 2022

(54) MODEL FORMATION MODULE FOR CREATING A MODEL FOR CONTROLLING A PRESSURE REGULATING SYSTEM OF A WATER SUPPLY NETWORK

(71) Applicant: GRUNDFOS HOLDING A/S, Bjerringbro (DK)

(72) Inventor: Carsten Skovmose Kallesøe, Viborg (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 279 days.

(21) Appl. No.: 16/021,935

(22) Filed: Jun. 28, 2018

(65) Prior Publication Data
US 2019/0004499 A1 Jan. 3, 2019

(30) Foreign Application Priority Data
Jun. 29, 2017 (EP) ..................................... 17178791

(51) Int. Cl.
*G05B 19/00* (2006.01)
*G05B 19/416* (2006.01)
(Continued)

(52) U.S. Cl.
CPC .......... *G05B 19/416* (2013.01); *F04B 49/065* (2013.01); *F04B 49/08* (2013.01);
(Continued)

(58) Field of Classification Search
CPC ........ E03B 1/02; E03B 7/075; F04B 2205/05; F04B 2205/08; F04B 23/04; F04B 49/065;
(Continued)

(56) References Cited

U.S. PATENT DOCUMENTS

| 2010/0168927 A1* | 7/2010 | Burrows | .................... E03B 1/00 700/282 |
| 2011/0290331 A1* | 12/2011 | Burrows | .................... E03B 7/02 137/14 |

(Continued)

FOREIGN PATENT DOCUMENTS

| EP | 2 778 296 A1 | 9/2014 |
| EP | 2 990 652 A1 | 3/2016 |

(Continued)

*Primary Examiner* — Michael D Masinick
(74) *Attorney, Agent, or Firm* — McGlew and Tuttle, P.C.

(57) ABSTRACT

A model formation module (25) is provided for creating a model for controlling a pressure regulating system (7) of a water supply network (5), wherein the water supply network (5) is equipped with one or more pressure sensors of which at least one remote pressure sensor (17a,b) is arranged remotely from the pressure regulating system (7), the model formation module (25) being configured to communicate with the at least one remote pressure sensor (17a,b). The model formation module (25) is configured to create said model without a measured, determined or estimated flow value on the basis of at least one remote pressure value determined by the at least one remote pressure sensor (17a,b) and on the basis of at least one load-dependent variable of the pressure regulating system (7), said model representing at least one pressure control curve for controlling the pressure regulating system (7).

28 Claims, 4 Drawing Sheets

(51) Int. Cl.
*G06Q 50/06* (2012.01)
*F04B 49/06* (2006.01)
*F04B 49/08* (2006.01)
*G05B 17/02* (2006.01)
*F04B 49/20* (2006.01)
*E03B 1/02* (2006.01)
*F04B 23/04* (2006.01)
*E03B 7/07* (2006.01)

(52) U.S. Cl.
CPC .............. *F04B 49/20* (2013.01); *G05B 17/02* (2013.01); *G06Q 50/06* (2013.01); *E03B 1/02* (2013.01); *E03B 7/075* (2013.01); *F04B 23/04* (2013.01); *F04B 2205/05* (2013.01); *F04B 2205/08* (2013.01); *G05B 2219/37399* (2013.01); *G05B 2219/41303* (2013.01)

(58) Field of Classification Search
CPC .......... F04B 49/08; F04B 49/20; G05B 17/02; G05B 19/416; G05B 2219/37399; G05B 2219/41303; G06Q 50/06
See application file for complete search history.

(56) References Cited

U.S. PATENT DOCUMENTS

| | | | |
|---|---|---|---|
| 2014/0255216 A1* | 9/2014 | Kallesoe | E03B 7/075 417/53 |
| 2014/0309796 A1 | 10/2014 | Mueller | |
| 2017/0037604 A1* | 2/2017 | Allmaras | G05B 19/042 |

FOREIGN PATENT DOCUMENTS

| | | | | |
|---|---|---|---|---|
| EP | 2990652 A1 * | 3/2016 | ......... | F04D 15/0066 |
| RU | 2 561 782 C1 | 9/2015 | | |
| WO | 2010/076558 A2 | 7/2010 | | |

* cited by examiner

MODEL FORMATION MODULE FOR CREATING A MODEL FOR CONTROLLING A PRESSURE REGULATING SYSTEM OF A WATER SUPPLY NETWORK

CROSS REFERENCE TO RELATED APPLICATIONS

This application claims the benefit of priority under 35 U.S.C. § 119 of European Application 17 178 791.4, filed Jun. 29, 2017, the entire contents of which are incorporated herein by reference.

TECHNICAL FIELD

The present disclosure is directed to a model formation module for creating a model for controlling a pressure regulating system of a water supply network, and a method for controlling a pressure regulating system of a water supply network. Water supply networks may for instance be installed in a large building or an agglomeration of buildings, like a city, a village, a town, a neighborhood or a quarter.

BACKGROUND

Typically, large buildings comprise multiple stories, levels, and/or sections, like rooms, flats, or offices, which are connected to a water supply network. Usually, a water supply network has a pressure regulating system in form of pumps and/or pressure reduction valves (PRV) in order to ensure that a desired pressure is available at all extraction points, e.g. tap connections, at any time. However, the demand of water and the extraction flow varies over time and differs between sections of the water supply network. Therefore, such a pressure regulating system needs an effective controlling to adapt the circulation power of pumps and/or the opening degree of PRVs to ensure that a desired pressure is available at any extraction point at any time.

EP 2 778 296 A1 describes a pump system for a water supply network, wherein the pump system comprises flow sensors or a flow determination device for feeding a flow-dependent model with flow values such that the pumps of the pump system can be controlled based on such a flow-dependent model.

Such a flow-dependent model requires either installation of flow sensors or an exact knowledge of the pump characteristics to determine the flow from electrical parameters of the pumps. Often, neither of this is available. There is a need for effectively controlling an existing water supply network without flow sensors and with a pressure regulating system having unknown characteristics.

SUMMARY

The model formation module according to the present disclosure provides an effective and robust model for controlling an existing water supply network without flow sensors and with a pressure regulating system having unknown characteristics. Even if the characteristics of the pressure regulating system were known at some point in time, e.g. the pump efficiency, these characteristics may change or degrade over time and usage. The model formation module described herein is configured to create a model that incorporates such changes automatically without knowing or determining such changes.

According to a first aspect of the present disclosure, a model formation module for creating a model for controlling a pressure regulating system of a water supply network is provided. The water supply network is equipped with one or more pressure sensors of which at least one remote pressure sensor is arranged remotely from the pressure regulating system. The model formation module is configured to communicate with the remote pressure sensor. The model formation module is configured to create said model without a measured, determined or estimated flow value on the basis of at least one remote pressure value determined by the at least one remote pressure sensor and on the basis of at least one load-dependent variable of the pressure regulating system, said model representing at least one pressure control curve for controlling the pressure regulating system.

The load-dependent variable of the pressure regulating system may not be directly flow-dependent, although the flow may somehow scale with the load-dependent variable. It is important to note that no flow value is measured, determined or estimated. Therefore, neither a flow sensor nor an exact knowledge of pump characteristics is needed. The model is based on the remote pressure value and the load-dependent variable directly and represents at least one pressure control curve. The model created by the model formation module may also allow for a detection of a leakage in the water supply network. For instance, the model may define a certain expected remote pressure value which may be compared with an actual remote pressure value provided by the remote pressure sensor.

Optionally, at least one of the at least one load-dependent variable may be a speed and/or an electrical power consumption of at least one pump of the pressure regulating system. This is in particular useful when the pressure in the water supply system is provided by one or more pump. Alternatively or in addition, at least one of the at least one load-dependent variable may represent an opening degree of a pressure reduction valve (PRV) of the pressure regulating system and/or a pressure difference before and after a pressure reduction valve of the pressure regulating system. This is in particular useful when the pressure in the water supply system is at least partially provided as hydrostatic pressure by an elevated water tank or a water tank at a high position in or on a building. It should be understood that the pressure regulating system may be a pressure regulating device like a pump and/or a PRV, or a system of two or more pressure regulating devices like several pumps and/or PRVs.

Optionally, the model formation module may be configured to communicate with a control unit for controlling a pressure regulating system. For instance, the model formation module may be implemented in a remote computer system, such as a cloud-based system comprised of one or more processors/computers, and in wired or wireless communication connection (link) with the control unit (having one or more processors a transmitter/receiver) which may be configured to control the pressure regulation system based on the model provided by the model formation module. Alternatively or in addition, the model formation module may be part of the control unit, comprised of a processor (µC, µP, DSP), a plurality of processors with one or more memory devices or in the form of instructions in a memory area, which instructions are processed by the one or more processor, for controlling a pressure regulating system.

Optionally, the model formation module may be configured to take into account, for creating said model, a pressure difference between the at least one remote pressure value determined by the least one remote pressure sensor and at least one outlet pressure value determined by at least one outlet pressure sensor of the one or more pressure sensors, the at least one outlet pressure sensor being arranged at an outlet side of the pressure regulating system.

For instance, the outlet pressure $p_{out}$ may be parameterized as $$p_{out} = f_\theta(\omega, s, P_{all}) + \theta_0 + p^*_{cri},$$

wherein $P_{all}$ is the power consumption of all active pumps of a pumping station serving as the pressure regulating system, s is the number of active pumps, $\omega$ is the speed of the active pumps, and $p^*_{cri}$ is a desired pressure at a remote point. An uncertainty term may be added to ensure that the pressure is always high enough at the remote point. The parameters $\theta$ and $\theta_0$ are model parameters that describe the optimal shape of the pressure control curve.

Optionally, the model parameters $\theta$ and $\theta_0$ may be determined by running measurement batches of the remote pressure value $p_{cri}$, the outlet pressure $p_{out}$ the pump speed $\omega$, the number of active pumps s, and the power consumption of all active pumps $P_{all}$. Assuming that a data batch contains N measurement sets labeled $1, \ldots, N$, the model parameters $\theta$ and $\theta_0$ may then be determined by solving the following optimization problem $$\theta_0, \theta = \underset{\theta_0, \theta}{\operatorname{argmin}} \sum_{i=1}^{N} ((p_{out,i} - p_{cri,i}) - (f_\theta(\omega_i, s_i, P_{all,i}) + \theta_0))^2,$$

wherein $p_{out,i} - p_{cri,i}$ is the pressure difference between the remote pressure value and the outlet pressure value for the i-th measurement set, where $i \in \{1, \ldots, N\}$.

Optionally, the function $f_\theta$ may be parameterized in the following form:

$$f_{\theta(\omega, z, P_{all})} = \left(\theta_1 s \omega - \sqrt{\theta_2 (s\omega)^2 + \theta_3 \frac{s^2}{\omega} + \theta_4 \frac{sP_{all}}{\omega}}\right)^2,$$

or a simpler parameterization may often suffice, e.g.

$$f_{\theta(\omega, zP_{all})} = \left(\theta_1 \frac{P_{all}}{\omega^2} + \theta_2 s\omega + \theta_3 \frac{s^2}{\omega^2}\right)^2.$$

If more measured or determined pressure values are available, the function can have other forms. For instance, at least one inlet pressure value may be determined by at least one inlet pressure sensor of the one or more pressure sensors, wherein the at least one inlet pressure sensor is arranged at an inlet side of the pressure regulating system. In this case, the model formation module may be configured to take into account said at least one inlet pressure value for creating said model.

So, in case the inlet pressure $p_{in}$ is available as an alternative to the power consumption of all active pumps $P_{all}$, the function may have the following form $$f_\theta(\omega, s, p_{out}, p_{in}) = (\theta_1 s \omega - \sqrt{\theta_2(s\omega)^2 + \theta_3 s^2 + \theta_4 s^2 (p_{out} - p_{in})})^2.$$

Also, this parametrisation may have simpler forms, e.g.:

$$f_\theta(\omega, s, p_{out}, p_{in}) = \left(\theta_1 \frac{p_{out} - p_{in}}{\omega} + \theta_2 \omega + \theta_3 \frac{1}{\omega}\right)^2$$

or $$f_\theta(\omega, s, p_{out}, p_{in}) = \left(\theta_1 s\omega - \sqrt{\theta_2(s\omega)^2 + \theta_4 s^2(p_{out} - p_{in})}\right)^2.$$

In case the inlet pressure n is available in addition to the power consumption of all active pumps $P_{all}$, the function may have the following form $$f_\theta(\omega, s, p_{out}, p_{in}) = \left(\theta_1 \frac{s}{\omega} + \theta_2 s \frac{p_{out} - p_{in}}{\omega} + \theta_3 \frac{P_{all}}{\omega^2} + \theta_4 s\omega\right)^2,$$

or in simpler form $$f_\theta(\omega, s, p_{out}, p_{in}) = \left(\theta_1 s \frac{p_{out} - p_{in}}{\omega} + \theta_2 \frac{P_{all}}{\omega^2} + \theta_3 s\omega\right)^2.$$

Optionally, the model formation module may be configured to update the model continuously, regularly or sporadically before, during or after operation of the pressure regulation system on the basis of changes in the at least one remote pressure value and/or the at least one load-dependent variable. This allows for taking into account pump efficiency degradations or other changes over time within the water supply network.

Optionally, the model formation module may be configured to take into account, for creating said model, at least one first section pressure value determined by at least one first section pressure sensor of the one or more pressure sensors, the at least one first section pressure sensor being arranged in a first section of the water supply network, and at least one second section pressure value determined by at least one second section pressure sensor of the one or more pressure sensors, the at least one second section pressure sensor being arranged in a second section of the water supply network, wherein the first and the second sections of the water supply network differ from each other and are arranged downstream of the pressure regulating system. This is advantageous for taking into account local pump efficiency degradations or other local changes in the first or second section of the water supply network. In this case, the model created by the model formation module may allow not only for a detection of a leakage in the water supply network, but also a localization of a leakage to a section of the water supply network. For instance, the model may define a certain expected first section pressure value which may be compared with an actual first section pressure value provided by the first section pressure sensor. If the actual value in the first section is significantly below the expected value, a leakage may be located in the first section. If the same discrepancy is detected in the second section, the leakage may be upstream of both the first and the second section.

Optionally, the model may represent a first pressure control curve for the first section and a second pressure control curve for the second section, wherein a first pressure demand is determinable from the first pressure control curve and a second pressure demand is determinable from the second pressure control curve based on the load-dependent variable, such that the higher of the first pressure demand and the second pressure demand is identifiable. This is in particular useful if the most critical section is not always the same. For instance, the most critical section in a multi-story building may always be the level(s) at highest altitude. However, in agglomerations with sections in form of neighborhoods or quarters, the pressure demand may change between the sections. The model representing one up-to-date pressure control curve for each section may then allow for determining the section with highest pressure demand based on the load-dependent variable to control the pressure regulation system in order to meet the highest pressure demand in the water supply network.

Optionally, the model formation module may be configured to update the model continuously, regularly or sporadically, wherein a previous or pre-determined pressure control curve is comparable with an updated pressure control curve for a given load-dependent variable, such that a leakage or blockage in the water supply network is identifiable based on such a comparison. The comparison and/or the leakage/blockage identification may be performed by the model formation module, the control unit and/or a separate leakage/blockage detection module. For instance, upon a model update, the pressure control curve may change outside of an expected range of change. Such a change may be an indication for a leakage or a blockage in the water supply network. A sudden high pressure demand according to the updated model may indicate a leakage.

Likewise, a sudden low pressure demand according to the updated model may indicate a blockage.

Optionally, the model formation module may be configured to create the model representing at least one pressure control curve for controlling the pressure regulating system in such a way that at least one critical pressure value is kept above a pre-determined threshold value, wherein the at least one critical pressure value is determined by at least one critical pressure sensor of the one or more pressure sensors, the at least one critical pressure sensor being arranged in a critical pressure section of the water supply network. The critical pressure sensor may be one of the remote pressure sensors. A critical pressure section of the water supply network may be a section of notionally minimal pressure within the network, for instance a section furthest away from the pressure regulating system or a section with the highest altitude in the water supply network. Thereby, the pressure regulating system controlled according to the at least one pressure control curve makes sure that a minimum pressure is provided in the most critical section and thus in all other sections of the water supply network.

Optionally, the model formation module may comprise a data memory cooperating with one or more processors and is configured to store one or more of the at least one remote pressure value and/or the at least one load-dependent variable at one or more different points in time. Alternatively or in addition, the model formation module may be configured to receive continuously, regularly or sporadically data comprising one or more of the at least one remote pressure value and/or the at least one load-dependent variable, said data being stored at one or more different points in time in at least one data storage of the one or more pressure sensors. Thereby, the communication of data may be restricted to regular or sporadic communication batches, e.g. once or more times per hour, per day, or per week. This saves energy consumption compared to a continuous data transmission and allows usage of battery powered pressure sensors including a data storage and a communication unit.

Optionally, the model may represent at least one pressure control curve representing a necessary outlet pressure value at an outlet of the pressure regulating system as a function of the at least one load-dependent variable and at least one model parameter for achieving a desired remote pressure value at the at least one remote pressure sensor. For instance, the necessary outlet pressure $p_{out}$ may be parameterized as $$p_{out} = f_\theta(\omega, s, P_{all}) + \theta_0 + p^*_{cri},$$

wherein the at least one load-dependent variable is $P_{all}$, i.e. the power consumption of all active pumps of a pumping station serving as the pressure regulating system, s is the number of active pumps, $\omega$ is the speed of the active pumps, and $p^*_{cri}$ is a desired remote pressure value. The parameters $\theta$ and $\theta_0$ are the model parameters that describe the optimal shape of the at least one pressure control curve.

Optionally, the model may comprise a time dependency of the necessary outlet pressure, preferably a day time dependency. One way to include a time dependency into the model may be to scale the function $f_\theta$ with a time dependent function $\eta$. The parameter $\lambda$ may describe the time dependency on an arbitrary scale, e.g. $0 < \lambda < 1$, where $\lambda = 0$ represents the start of the day at 0.00 am $\lambda = 1$ represents the end of the day at 12.00 pm, and may be determined along with the parameters $\theta$, $\theta_0$ to create or update the model. The complete set of parameters may then be determined by solving the minimization problem $$\theta_0, \theta, \lambda = \underset{\theta_0, \theta, \lambda}{\arg\min} \sum_{i=1}^{N} ((p_{out,i} - p_{cri,i}) - (\eta(t_i) f_\theta(\omega_i, s_i, P_{all,i}) + \theta_0))^2.$$

As the behavior of a water supply network is usually periodic, a Fourier Series may be used as an adequate approximation for the timedependent function n, i.e.

$$\eta(t) = 1 + \lambda_1 \cos(\omega t) + \lambda_2 \sin(\omega t) + \lambda_2 \cos(2\omega t) + \lambda_4 \sin(2\omega t) + \ldots$$

According to a second aspect of the present disclosure, a method for controlling a pressure regulating system of a water supply network is provided, wherein the water supply network is equipped with one or more pressure sensors of which at least one remote pressure sensor is arranged remotely from the pressure regulating system, the method comprising:

creating a model without a measured, determined or estimated flow value on the basis of at least one remote pressure value determined by the at least one remote pressure sensor and on the basis of at least one load-dependent variable of the pressure regulating system, said model representing at least one pressure control curve for controlling the pressure regulating system, and controlling the pressure regulating system on the basis of said model.

Optionally, at least one of the at least one load-dependent variable may be a speed and/or an electrical power consumption of at least one pump of the pressure regulating system. Alternatively or in addition, at least one of the at least one load-dependent variable may represent an opening degree of a pressure reduction valve of the pressure regulating system and/or a pressure difference before and after a pressure reduction valve of the pressure regulating system.

Optionally, the step of creating said model may comprise taking into account a pressure difference between the at least one remote pressure value determined by the least one remote pressure sensor and at least one outlet pressure value determined by at least one outlet pressure sensor of the one or more pressure sensors, the at least one outlet pressure sensor being arranged at an outlet side of the pressure regulating system.

Optionally, the step of creating the model and/or the step of controlling the pressure regulating system may comprise taking into account at least one inlet pressure value determined by at least one inlet pressure sensor of the one or more pressure sensors, the at least one inlet pressure sensor being arranged at an inlet side of the pressure regulating system.

Optionally, the method may further comprise a step of updating the model continuously, regularly or sporadically before, during or after operation of the pressure regulation system on the basis of changes in the at least one remote pressure value and/or the at least one load-dependent variable.

Optionally, the step of creating the model and/or the step of controlling the pressure regulating system may comprise taking into account at least one first section pressure value determined by at least one first section pressure sensor of the one or more pressure sensors, the at least one first section pressure sensor being arranged in a first section of the water supply network, and at least one second section pressure value determined by at least one second section pressure sensor of the one or more pressure sensors, the at least one second section pressure sensor being arranged in a second section of the water supply network, wherein the first and the second sections of the water supply network differ from each other and are arranged downstream of the pressure regulating system.

Optionally, the model may represent a first pressure control curve for the first section and a second pressure control curve for the second section, wherein creating and/or updating the model comprises determining a first pressure demand from the first pressure control curve and a second pressure demand from the second pressure control curve based on the load-dependent variable, and the pressure regulating system is controlled according to the higher of the first pressure demand and the second pressure demand. This is in particular useful if the most critical section is not always the same. For instance, the most critical section in a multi-story building may always be the level(s) at highest altitude. However, in agglomerations with sections in form of neighborhoods or quarters, the pressure demand may change between the sections. The model representing one updated pressure control curve for each section may then allow for determining the section with highest pressure demand based on the load-dependent variable to control the pressure regulation system in order to meet the highest pressure demand in the water supply network.

The method may thus further comprise detecting a leakage in the water supply network and/or localizing a leakage to a section of the water supply network. For instance, the model may define a certain expected first section pressure value which may be compared with an actual first section pressure value provided by the first section pressure sensor. If the actual value in the first section is significantly below the expected value, a leakage may be located in the first section. If the same discrepancy is detected in the second section, the leakage may be upstream of both the first and the second section. The leakage detection and/or localization may be performed by the model formation module, the control unit and/or a separate leakage detection module.

Optionally, the method may further comprise updating the model continuously, regularly or sporadically, comparing a previous or pre-determined pressure control curve with an updated pressure control curve for a given load-dependent variable, and identifying a leakage and/or a blockage in the water supply network based on comparing the previous or pre-determined pressure control curve with an updated pressure control curve. The comparison and/or the leakage/blockage identification may be performed by the model formation module, the control unit and/or a separate leakage/blockage detection module. For instance, upon a model update, the pressure control curve may change outside of an expected range of change. Such a change may be an indication for a leakage or a blockage in the water supply network. A sudden high pressure demand according to the updated model may indicate a leakage. Likewise, a sudden low pressure demand according to the updated model may indicate a blockage.

Optionally, the step of controlling the pressure regulating system may comprise keeping at least one critical pressure value above a pre-determined threshold value, wherein the at least one critical pressure value is determined by at least one critical pressure sensor of the one or more pressure sensors, the at least one critical pressure sensor being arranged in a critical pressure section of the water supply network.

Optionally, the method may further comprise a step of storing one or more of the at least one remote pressure value and/or the at least one load-dependent variable at one or more different points in time.

Optionally, the method may further comprise a step of receiving continuously, regularly or sporadically data comprising one or more of the at least one remote pressure value and/or the at least one load-dependent variable, said data being stored at one or more different points in time in at least one data storage of the one or more pressure sensors.

Optionally, the model may represent at least one pressure control curve representing a necessary outlet pressure value at an outlet of the pressure regulating system as a function of the at least one load-dependent variable and at least one model parameter for achieving a desired remote pressure value at the at least one remote pressure sensor.

Optionally, the model may comprise a time dependency of the necessary outlet pressure, preferably a day time dependency.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

Embodiments of the present disclosure will now be described by way of example with reference to the following figures of which.

DETAILED DESCRIPTION

Figure 1:
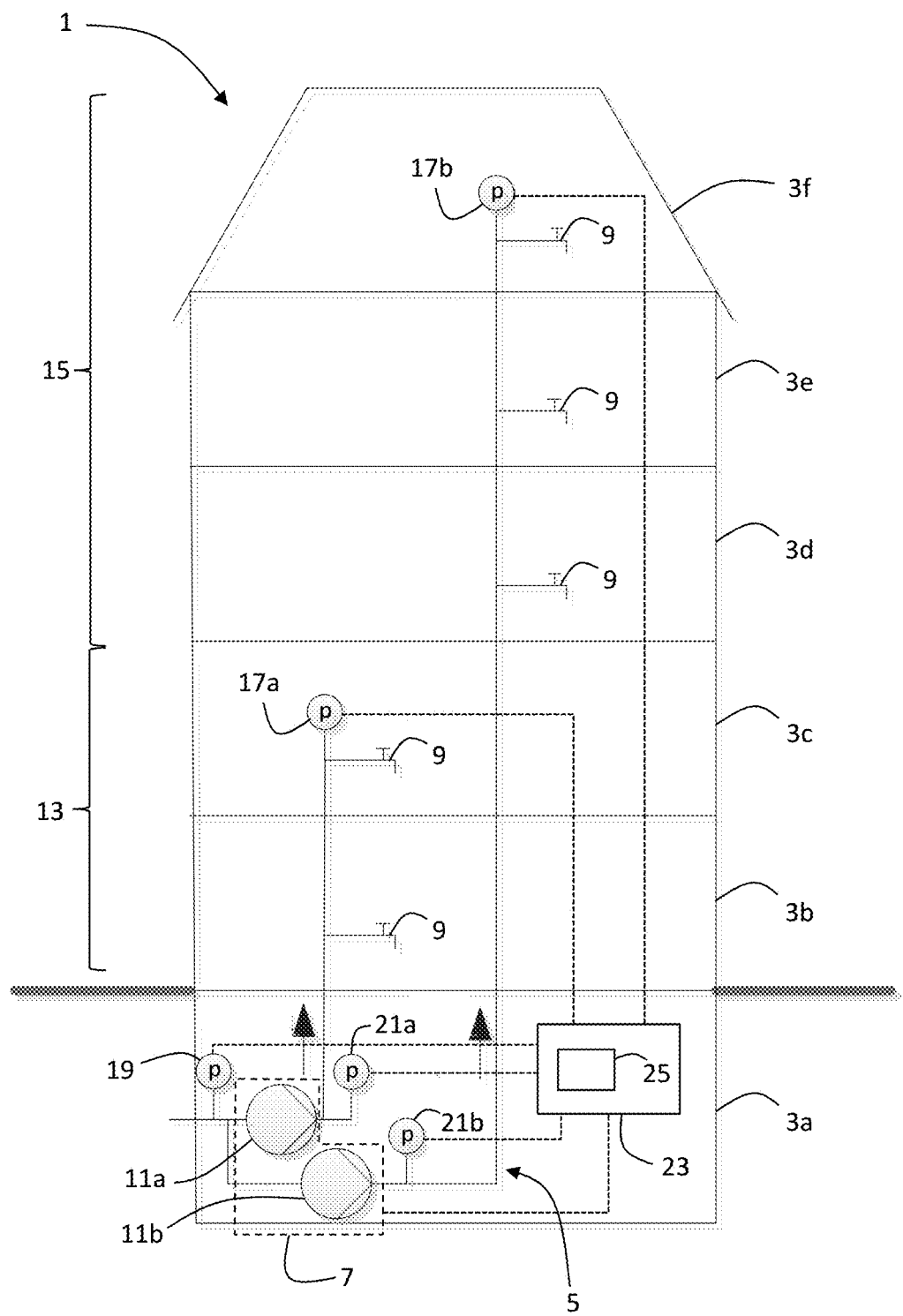
FIG. 1 is a schematic view showing an example of a first embodiment of a water supply network according to the present disclosure.

FIG. 1 shows a large building 1 with several levels, stories or floors 3a-f. A water supply network 5 connects a pressure regulating system 7 in form of a pumping station located in the basement 3a of the building 1 with all levels 3b-f above. From ground floor 3b to top floor 3f, each level has at least one tap connection 9 for extracting water. The pressure regulating system 7 comprises two pumps 11a,b. It should be noted that the pumps 11a,b may each be a single pump or a system of pumps. A first pump 11a is connected to a first section 13 of the building, i.e. the ground floor 3b and the first floor 3c, and a second pump 11b is connected to a second section 15 of the building, i.e. the second floor 3d to the top floor 3f.

The water supply network 5 further comprises two remote pressure sensors 17a,b, wherein the remote pressure sensors 17a,b are arranged remotely from the pressure regulating system 7. A first remote pressure sensor 17a is located at a point of highest altitude within the first section 13, i.e. in the first floor 3c. The first floor 3c is here a critical pressure section of the water supply network. A second remote pressure sensor 17b is located at a point of highest altitude within the second section 15, i.e. in the top floor 3f. The top floor 3f is here another critical pressure section of the water supply network.

The water supply network 5 further comprises an inlet pressure sensor 19 being arranged at an inlet side of the pressure regulating system 7 and two outlet sensors 21a,b, wherein a first outlet pressure sensor 21a is arranged at an outlet side of the first pump 11a and a second outlet pressure sensor 21b is arranged at an outlet side of the second pump 11b.

In order to control the pumps 11a,b of the pressure regulating system 7 efficiently for providing a desired water pressure at all extraction points 9 at all times, a control unit 23 is in communication connection with each of the pumps 11a,b and to all pressure sensors 17a,b, 19, and 21a,b of the water supply network 5. Such communication connection and/or the control connection to the pressure regulation system 7 may be wired or wireless. The communication may be continuous, or preferably in regular or sporadic communication batches for saving power consumption. The control unit 23 is configured to control the pressure regulating system 7 on the basis of a model. The control unit 23 comprises a processor (μC, NP, DSP) or a plurality of processors with an associated memory providing a model formation module for creating that model without a measured, determined or estimated flow value.

The model uses a parameterization which is not directly flow dependent:

$$p_{out} = f_\theta(\omega, s, P_{all}) + \theta_0 + p^*_{cri},$$

wherein $P_{all}$ is the power consumption of the two pumps 11a,b, s is the number of pumps, i.e. s=2, $\omega$ is the speed of the pumps 11a,b, and $p^*_{cri}$ is the desired pressure at the critical points, i.e. at the remote sensors 17a,b. *The parameters $\theta$ and $\theta_0$* are parameters that describe the optimal shape of the pressure control curve. The flow may somehow scale with the speed and/or the power consumption of the pumps 11a,b, but the flow is and remains undetermined. It should be noted that the water supply network 5 does not comprise flow sensors. Furthermore, the pumps 11a,b may have unknown efficiency so that the flow cannot be determined based on the speed and/or the power consumption of the pumps 11a,b.

The model parameters $\theta$ and $\theta_0$ are determined by running measurement batches of a critical remote pressure value $p_{cri}$ determined by the remote pressure sensors 17a,b, an outlet pressure $p_{out}$ determined by the outlet pressure sensors 21a,b, the pump speed a of each pump 11a,b, the number of active pumps s=2, and the power consumption of the two pumps $P_{all}$. Assuming that a data batch contains N measurement sets labelled 1, . . . , N, the model parameters $\theta$ and $\theta_0$ are then determined by solving the following optimization problem $$\theta_0, \theta = \operatorname*{argmin}_{\theta_0, \theta} \sum_{i=1}^{N} ((p_{out,i} - p_{cri,i}) - (f_\theta(\omega_i, s_i, P_{all,i}) + \theta_0))^2,$$

wherein $p_{out,i} - p_{cri,i}$ is the pressure difference between the remote pressure value $p_{cri,i}$ and the outlet pressure value $p_{out,i}$ for the i-th measurement set, where $i \in \{1, \ldots, N\}$.

The function $f_\theta$ may be parameterized in the following form:

$$f_{\theta(\omega, s, P_{all})} = \left(\theta_1 s\omega - \sqrt{\theta_2 (s\omega)^2 + \theta_3 \frac{s^2}{\omega} + \theta_4 \frac{s P_{all}}{\omega}}\right)^2,$$

or a simpler parametrisation may often suffice, e.g.

$$f_{\theta(\omega, s, P_{all})} = \left(\theta_1 \frac{P_{all}}{\omega^2} + \theta_2 s\omega + \theta_3 \frac{s}{\omega^2}\right)^2.$$

In this case, more variables are available so that the parameterization can take a different form. Here, the inlet pressure value is determined by the inlet pressure sensor 19 and communicated to the control unit 23. The control unit 23 can thus take into account the inlet pressure A for creating the model and/or controlling the pressure regulating system 7.

So, in case the inlet pressure $p_{in}$ is available as an alternative to the power consumption of all active pumps $P_{all}$, the function may have the following form $$f_\theta(\omega, s, p_{out}, p_{in}) = (\theta_1 s\omega - \sqrt{\theta_2(s\omega)^2 + \theta_2 s^2 + \theta_4 s^2 (p_{out} - p_{in})})^2.$$

Also, this parameterization may have simpler forms, e.g.:

$$f_\theta(\omega, s, p_{out}, p_{in}) = \left(\theta_1 \frac{p_{out} - p_{in}}{\omega} + \theta_2 \omega + \theta_3 \frac{1}{\omega}\right)^2$$

or $$f_\theta(\omega, s, p_{out}, p_{in}) = \left(\theta_1 s\omega - \sqrt{\theta_2(s\omega)^2 + \theta_4 s^2(p_{out} - p_{in})}\right)^2.$$

In case the inlet pressure $p_{in}$ is available in addition to the power consumption of all active pumps $P_{all}$, the function may have the following form $$f_\theta(\omega, s, p_{out}, p_{in}) = \left(\theta_1 \frac{s}{\omega} + \theta_2 s \frac{p_{out} - p_{in}}{\omega} + \theta_3 \frac{P_{all}}{\omega^2} + \theta_4 s\omega\right)^2,$$

or in simpler form $$f_\theta(\omega, s, p_{out}, p_{in}) = \left(\theta_1 s \frac{p_{out} - p_{in}}{\omega} + \theta_2 \frac{P_{all}}{\omega^2} + \theta_3 s\omega\right)^2.$$

Once the model is created by the model formation module 25, the control unit 23 controls the pumps 11a,b based on that model. The model is regularly updated and/or when significant changes are detected. The control unit 23 controls the pumps 11a,b in a way to always makes sure that a minimal pressure above a pre-determined threshold is available at the critical highest points for each of the sections 13, 15.

The model may comprise a time dependency of the necessary outlet pressure, preferably a day time dependency. The function $f_\theta$ may scale with a time dependent function n, wherein the parameter λ may describe the time dependency on an arbitrary scale, e.g. 0<λ<1, where λ=0 represents the start of the day at 0.00 am λ=1 represents the end of the day at 12.00 pm, and may be determined along with the parameters θ, $θ_0$ to create or update the model. The complete set of parameters may then be determined by solving the minimization problem $$\theta_0, \theta, \lambda = \arg\min_{\theta_0, \theta, \lambda} \sum_{i=1}^{N} ((p_{out,i} - p_{cri,i}) - (\eta(t_i) f_\theta(\omega_i, s_i, P_{all,i}) + \theta_0))^2.$$

As the behavior of a water supply network is usually periodic, a Fourier Series may be used as an adequate approximation for the timedependent function η, i.e.

η(t)=1+$λ_1$ cos(ωt)+$λ_2$ sin(ωt)+$λ_2$ cos(2ωt)+$λ_4$ sin (2ωt)+ . . .

Figure 2:
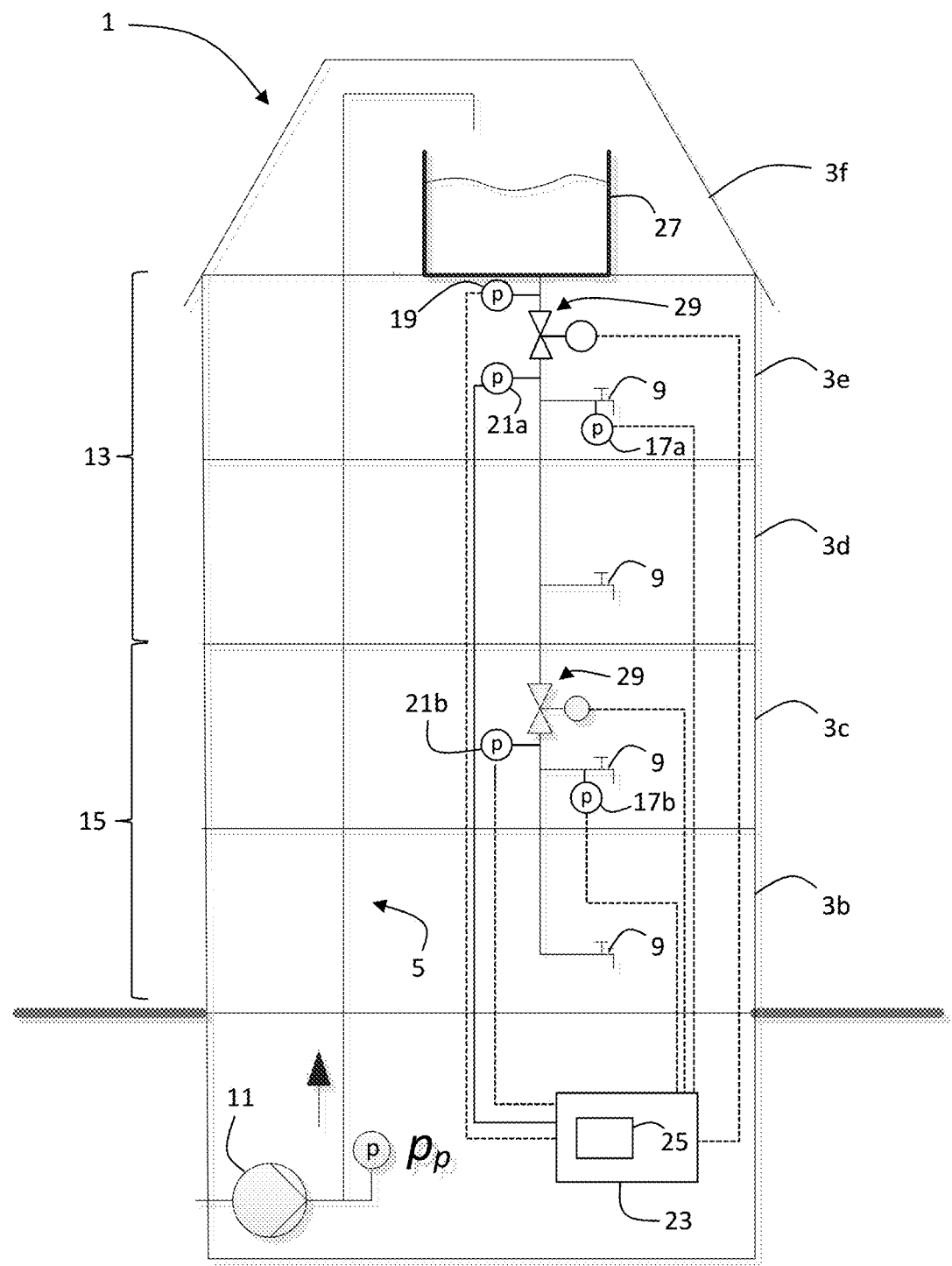
FIG. 2 is a schematic view showing an example of a second embodiment of a water supply network according to the present disclosure.

FIG. 2 shows an example of second embodiment of a water supply network 5 in a high building 1. In this embodiment, the pressure regulating system 7 comprises a pump 11 in the basement 3a of the building 1, a water storage tank 27 on the top floor 3f of the building 1 and two pressure reduction valves (PRV) 29, one the first floor 3c and one the third floor 3e. The pump 11 is connected to the water storage tank 27 to keep it filed with a sufficient level of water. A first remote pressure sensor 17a is located on the third floor 3e downstream of the upper PRV 29, and a second remote pressure sensor 17b is located on the first floor 3c downstream of the lower PRV 29. The lower PRV 29 separates a first section 13 of the water supply network 5, i.e. the second floor 3d and the third floor 3e, from a second section 15 of the water supply network 5, i.e. the ground floor 3b and the first floor 3c. With respect to the first section 13, the third floor 3e is a critical high section where the first remote pressure sensor 17a is located at a position furthest away from the upper PRV 29. With respect to the second section 13, the first floor 3c is a critical high section where the second remote pressure sensor 17b is located at a position furthest away from the lower PRV 29. An inlet pressure sensor 19 may be installed at the inlet side of each PRV 29 (here is only one inlet pressure sensor 19 shown at the inlet side of the upper PRV 29). An outlet pressure sensor 21a,b may be installed at the outlet side of each PRV 29.

The model to control the opening degree of the PRV 29 is similar to the control of the pumps 11a,b in the first embodiment of FIG. 1, with the only difference that the function $f_\theta$ now describes the PRVs 29 and not the pumps 11a,b. The opening degree $x_p$ of the valve is measured and communicated to the control unit 25. The function $f_\theta$ is then parameterized as $f_\theta(x_p, p_{in}, p_{out}) = \theta_1(p_{out} - p_{in}) + \theta_2 x_p(p_{out} - p_{in}) + \theta_2 x_p^2 (p_{out} - p_{in}) + \ldots$, wherein the polynomial may at least be of the second order. The time dependency may be included in the same way as for the pumps 11a,b, hence the following model may be used:

$p_{out} = \eta(t) f_\theta(x_p, p_{in}, p_{out}) + \theta_0 + p^*_{cri}$. As an alternative or in addition to the measured opening degree of the PRVs, the pressure difference $p_{out} - p_{in}$ before and after the PRVs may serve as the load-dependent variable of the pressure regulation system 7.

Figure 3:
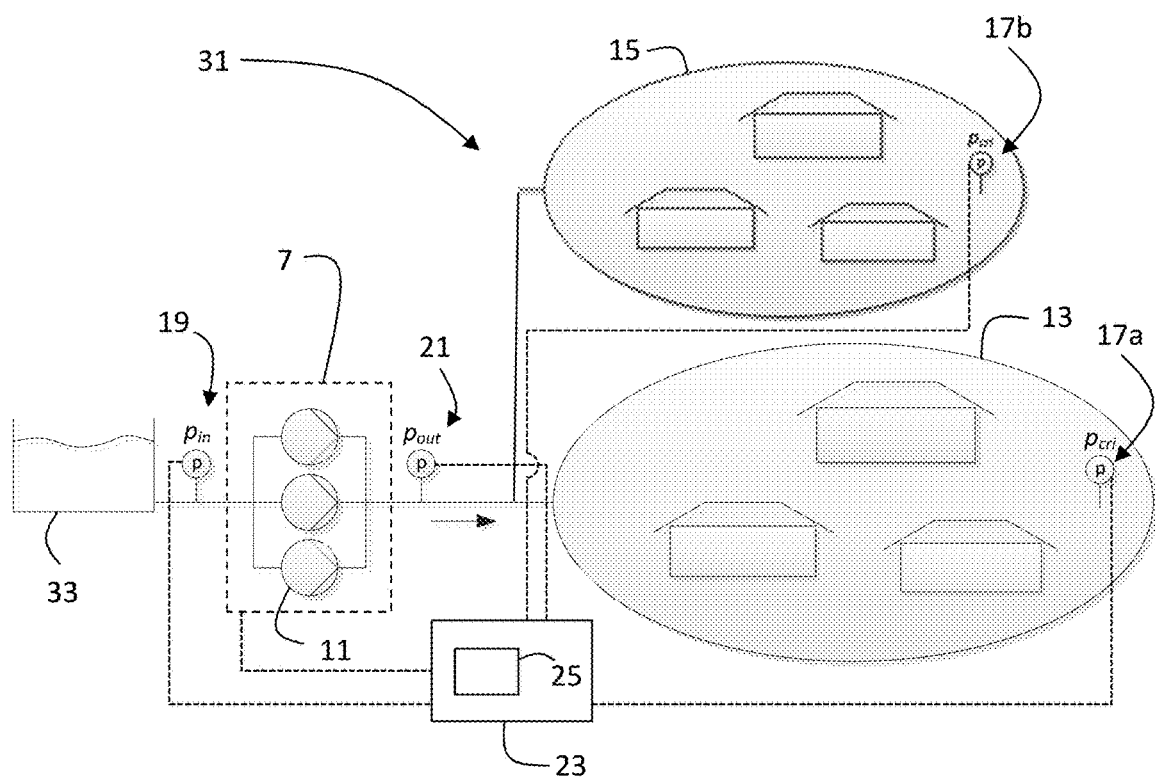
FIG. 3 is a schematic view showing an example of a third embodiment of a water supply network according to the present disclosure.

FIG. 3 shows an example of a third embodiment of a water supply network 5 for an agglomeration 31 of buildings. A pressure regulating system 7 in form of a pumping station with a plurality of pumps 11 draws water from a water source 33 and supplies water to the agglomeration 31. For each section 13, 15, at critical points of furthest distance and/or highest altitude, remote critical section pressure sensors 17a,b are located with a communication connection to a control unit 23. The control unit 23 also receives an inlet pressure value from an inlet pressure sensor 19 and an outlet pressure value from an outlet pressure sensor 21. The control unit 23 with its model formation module 25 creates and updates a model for controlling the pumps 11 based on the received pressure values and a load-dependent variable such as the speed and/or the power consumption of the active pumps 11. The model parameterization is the same as above.

Figure 4:
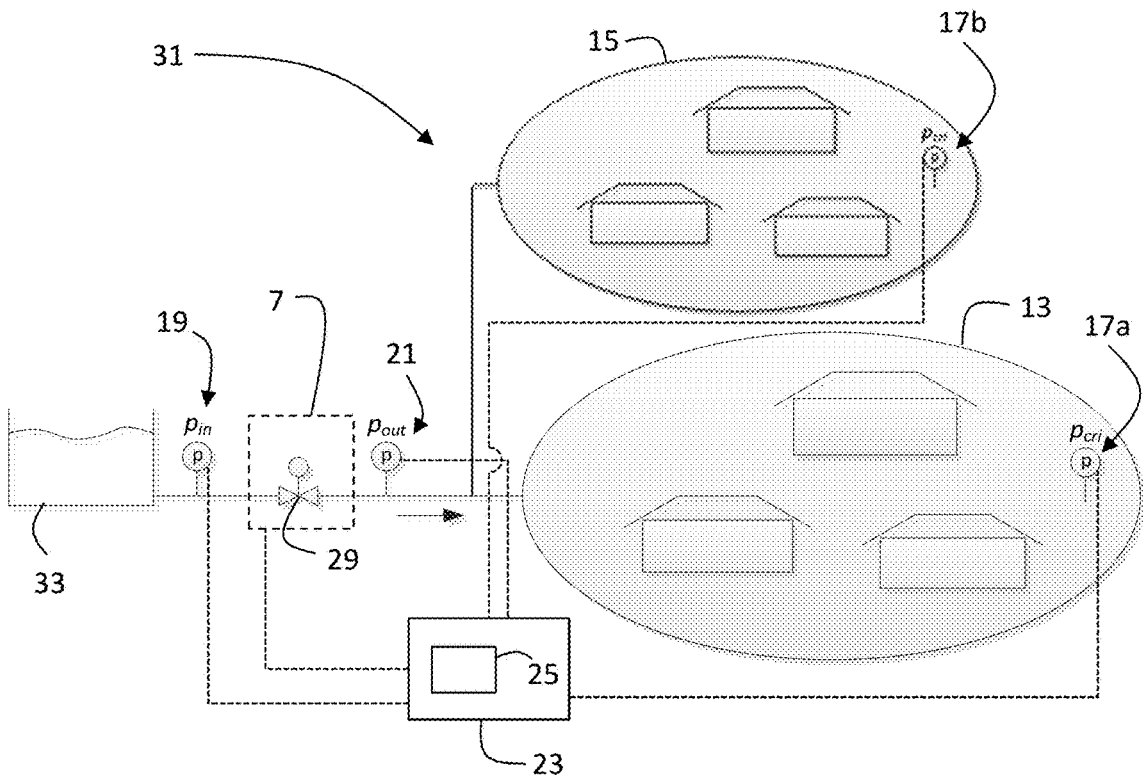
FIG. 4 is a schematic view showing an example of a fourth embodiment of a water supply network according to the present disclosure.

FIG. 4 shows an example of a fourth embodiment of a water supply network 5 for an agglomeration 31 of buildings. A pressure regulating system 7 in form of a PRV 29 reduces the hydrostatic pressure from a high altitude water source 33 and thus controls the water supply to the agglomeration 31. The high altitude water source 33 may be a mountain lake or fountain. At a critical point of furthest distance and/or highest altitude, a remote critical section pressure sensor 17 is located with a communication connection to a control unit 23. The control unit 23 also receives an inlet pressure value from an inlet pressure sensor 19 and an outlet pressure value from an outlet pressure sensor 21. The control unit 23 with its model formation module 25 creates and updates a model for controlling the pumps 11 based on the received pressure values and a load-dependent variable such as the opening degree of the PRV 29. The model parameterization is the same as above.

The agglomeration 31 is here provided with water by a water supply network 5 having a first section 13 and a second section 15. Each section 13, 15 is provided with at least one remote critical sensor 17a,b. The model then represents a pressure control curve for each section 13, 15. At a given load-dependent variable, the control unit 23 may then control the pressure regulation system 7 in such a way that the higher of the two pressure demands according to the two pressure control curves is met.

Figure 5:
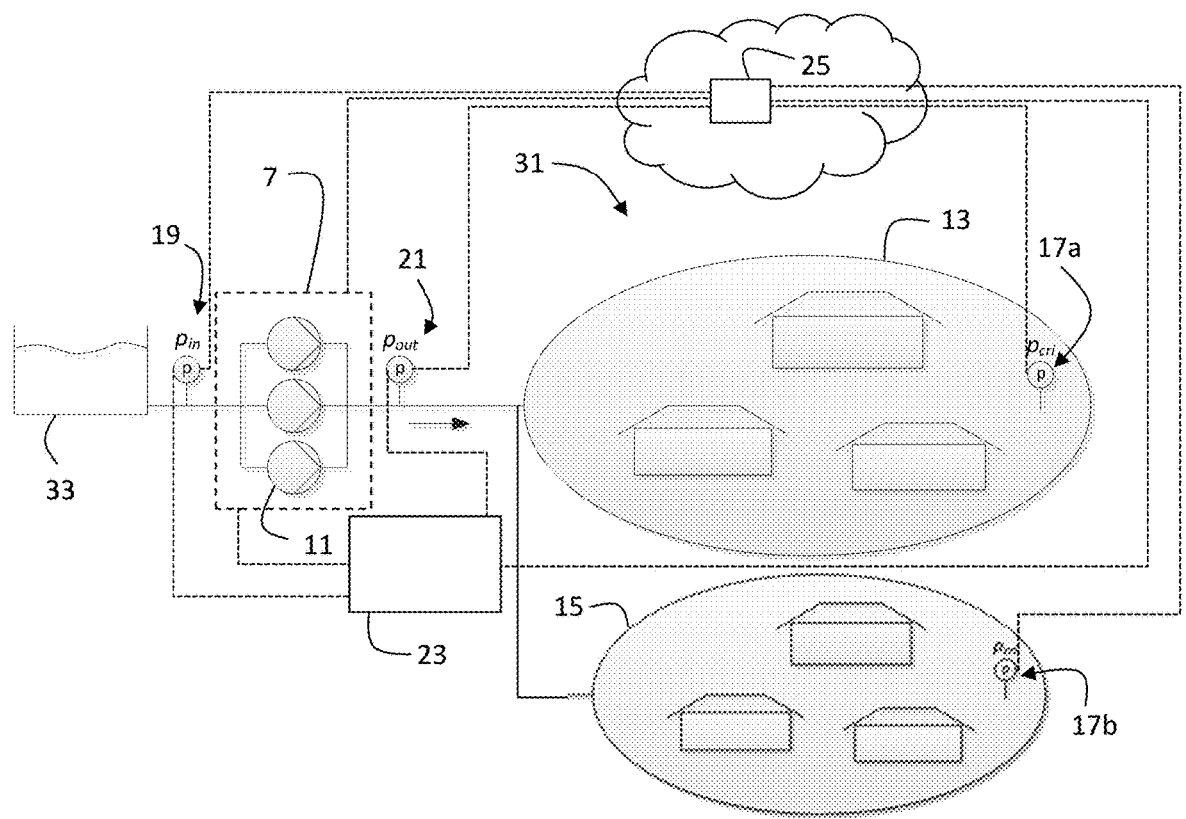
FIG. 5 is a schematic view showing an example of a fifth embodiment of a water supply network according to the present disclosure.
Figure 6:
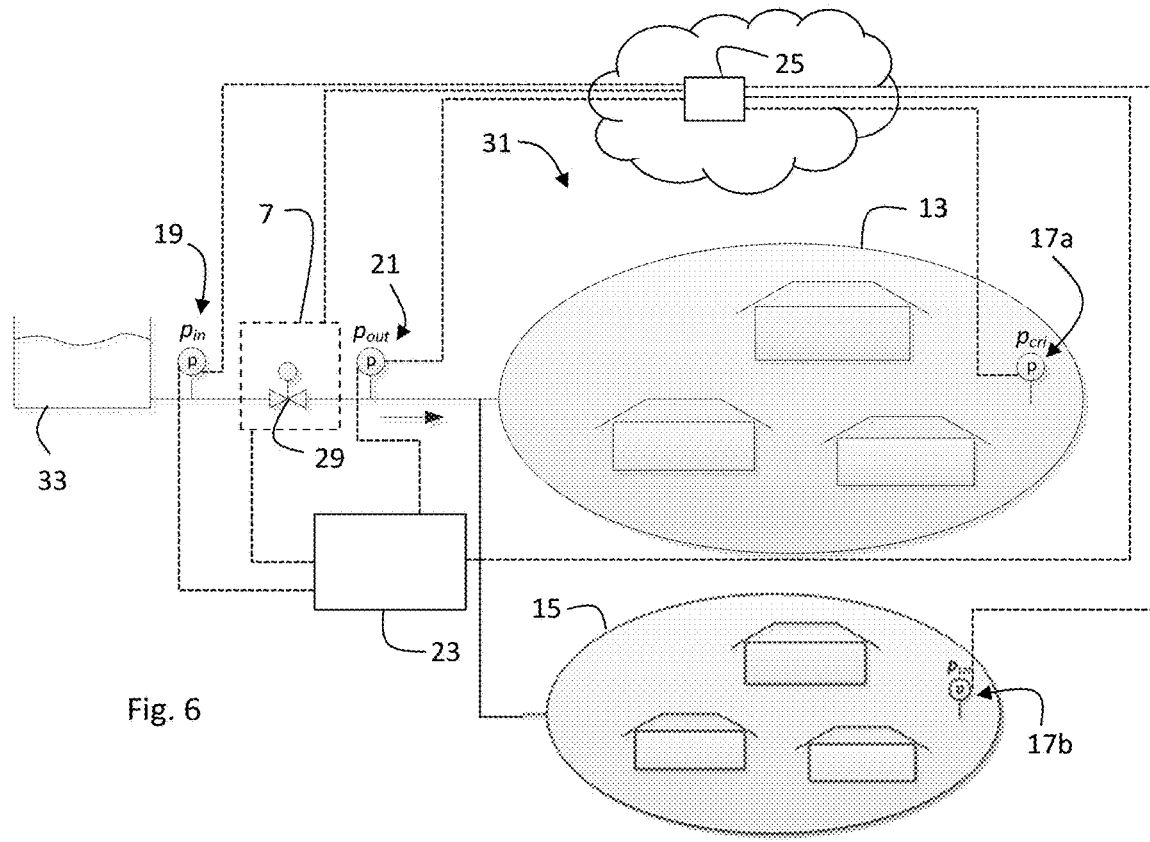
FIG. 6 is a schematic view showing an example of a sixth embodiment of a water supply network according to the present disclosure.

FIGS. 5 and 6 show examples of a fifth and sixth embodiment of a water supply network 5 for an agglomeration 31 of buildings, wherein the model formation module 25 is not part of the control unit 23, but installed on a remote computer system such as a cloud-based system (illustrated as a weather cloud in FIGS. 5 and 6). The model formation module 25 is in wired or wireless communication connection with the pressure sensors 17a,b, 19, 21, the pressure regulation system 7 and the control unit 23. The communication connection (link) is provided with a wired or wireless transmitter/receiver arrangement and one or more processor associated with the control unit 23. The direct connection with the pressure regulation system 7 may not be needed if the control unit 23 is configured to communicate the load-dependent variable to the model formation module 25. The model is provided by the model formation module 25 to the control unit 23 by way of the communication link between them.

The agglomeration 31 is provided with water by a water supply network having a first section 13 and a second section 15. Each section 13, 15 is provided with at least one remote critical sensor 17a,b. It should be noted that, in this embodiment, the remote critical sensors 17a,b are not connected to the control unit 25, but merely communicate preferably sporadically or regularly batch-wise, with the model formation module 25 for creating the model or keeping it up-to-date. The model then represents one pressure control curve for each section 13, 15. The control unit 23 also receives an inlet pressure value from an inlet pressure sensor 19 and an outlet pressure value from an outlet pressure sensor 21. At a given load-dependent variable, the control unit 23 may then control the pressure regulation system 7 in such a way that the higher of the two pressure demands according to the two pressure control curves is met.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art.

Such modifications, substitutions and alternatives can be made without departing from the spirit and scope of the disclosure, which should be determined from the appended claims and their legal equivalents.

While specific embodiments of the invention have been shown and described in detail to illustrate the application of the principles of the invention, it will be understood that the invention may be embodied otherwise without departing from such principles.

What is claimed is:

1. A control unit for controlling a pressure regulating system of a water supply network, the control unit comprising:
    a model formation module for creating a model for controlling the pressure regulating system of the water supply network, wherein the water supply network is equipped with one or more pressure sensors of which at least one remote pressure sensor is arranged remotely from the pressure regulating system, the model formation module being configured to:
    communicate with the at least one remote pressure sensor; and
    create said model, without a measured, determined or estimated flow value, on the basis of at least one remote pressure value determined by the at least one remote pressure sensor and on the basis of at least one load-dependent variable of the pressure regulating system, said model representing at least one pressure control parametrization for controlling the pressure regulating system, the at least one pressure control parametrization representing a necessary outlet pressure value at an outlet of the pressure regulating system as a function of the at least one load-dependent variable and at least one model parameter for achieving a desired remote pressure value at the at least one remote pressure sensor.

2. The control unit according to claim 1, wherein at least one of the at least one load-dependent variable is an electrical power consumption of at least one pump of the pressure regulating system or a speed of at least one pump of the pressure regulating system or both an electrical power consumption and a speed of at least one pump of the pressure regulating system.

3. The control unit according to claim 1, wherein at least one of the at least one load-dependent variable represents an opening degree of a pressure reduction valve of the pressure regulating system or a pressure difference before and after a pressure reduction valve of the pressure regulating system or both an opening degree of a pressure reduction valve of the pressure regulating system and a pressure difference before and after a pressure reduction valve of the pressure regulating system.

4. The control unit according to claim 1, wherein the model formation module is further configured to be in communication connection with a control unit for controlling the pressure regulating system.

5. The control unit according to claim 1, wherein the model formation module is further configured to take into account, for creating said model, a pressure difference between the at least one remote pressure value determined by the at least one remote pressure sensor and at least one outlet pressure value determined by at least one outlet pressure sensor of the one or more pressure sensors, the at least one outlet pressure sensor being arranged at an outlet side of the pressure regulating system.

6. The control unit according to claim 1, wherein the model formation module is further configured to take into account, for creating said model, at least one inlet pressure value determined by at least one inlet pressure sensor of the one or more pressure sensors, the at least one inlet pressure sensor being arranged at an inlet side of the pressure regulating system.

7. The control unit according to claim 1, wherein the model formation module is further configured to update the model continuously, regularly or sporadically before, during or after operation of the pressure regulation system on the basis of changes in the at least one remote pressure value or on the basis of the at least one load-dependent variable or on the basis of changes in the at least one remote pressure value and on the basis of the at least one load-dependent variable.

8. The control unit according to claim 1, wherein the model formation module is further configured to take into account, for creating said model, at least one first section pressure value determined by at least one first section pressure sensor of the one or more pressure sensors, the at least one first section pressure sensor being arranged in a first section of the water supply network, and at least one second section pressure value determined by at least one second section pressure sensor of the one or more pressure sensors, the at least one second section pressure sensor being arranged in a second section of the water supply network, wherein the first and the second sections of the water supply network differ from each other and are arranged downstream of the pressure regulating system.

9. The control unit according to claim 8, wherein:
the model represents a first pressure control parametrization for the first section and a second pressure control parametrization for the second section; and
a first pressure demand is determinable from the first pressure control parametrization and a second pressure demand is determinable from the second pressure control parametrization based on the load-dependent variable, such that the higher of the first pressure demand and the second pressure demand is identifiable.

10. The control unit according to claim 1, wherein:
the model formation module is further configured to update the model continuously, regularly or sporadically; and
a previous or pre-determined pressure control parametrization of the model is compared with an updated pressure control parametrization for a given load-dependent variable, such that a leakage in the water supply network or a blockage in the water supply network or both a leakage and a blockage in the water supply network is identifiable based on such a comparison.

11. The control unit according to claim 1, wherein:
the model formation module is further configured to create the model representing at least one pressure control parametrization such that at least one critical pressure value is kept above a pre-determined threshold value; and
the at least one critical pressure value is determined by at least one critical pressure sensor of the one or more pressure sensors, the at least one critical pressure sensor being arranged in a critical pressure section of the water supply network.

12. The control unit according to claim 1, wherein the model formation module comprises a data memory and is configured to store one or more of the at least one remote pressure value or the at least one load-dependent variable or the at least one remote pressure value and the at least one load-dependent variable at one or more different points in time.

13. The control unit according to claim 1, wherein the model formation module is further configured to receive continuously, regularly or sporadically data comprising one or more of the at least one remote pressure value or the at least one load-dependent variable or the at least one remote pressure value and the at least one load-dependent variable, said data being stored at one or more different points in time in at least one data storage of the one or more pressure sensors.

14. The control unit according to claim 1, wherein the model comprises a time dependency of the necessary outlet pressure.

15. A method for controlling a pressure regulating system of a water supply network, wherein the water supply network is equipped with one or more pressure sensors of which at least one remote pressure sensor is arranged remotely from the pressure regulating system, the method comprising the steps of:
creating a model without a measured, determined or estimated flow value on the basis of at least one remote pressure value determined by the at least one remote pressure sensor and on the basis of at least one load-dependent variable of the pressure regulating system, said model representing at least one pressure control parametrization for controlling the pressure regulating system, the model representing at least one pressure control parametrization representing a necessary outlet pressure value at an outlet of the pressure regulating system as a function of the at least one load-dependent variable and at least one model parameter for achieving a desired remote pressure value at the at least one remote pressure sensor; and
controlling the pressure regulating system based on said model.

16. The method according to claim 15, wherein at least one of the at least one load-dependent variable is an electrical power consumption of at least one pump of the pressure regulating system or a speed of at least one pump of the pressure regulating system or an electrical power consumption and a speed of at least one pump of the pressure regulating system.

17. The method according to claim 15, wherein at least one of the at least one load-dependent variable represents an opening degree of a pressure reduction valve of the pressure regulating system or a pressure difference before and after a pressure reduction valve of the pressure regulating system or both an opening degree and a pressure difference before and after a pressure reduction valve of the pressure regulating system.

18. The method according to claim 15, wherein creating said model comprises taking into account a pressure difference between the at least one remote pressure value determined by the least one remote pressure sensor and at least one outlet pressure value determined by at least one outlet pressure sensor of the one or more pressure sensors, the at least one outlet pressure sensor being arranged at an outlet side of the pressure regulating system.

19. The method according to claim 15, wherein creating the model or controlling the pressure regulating system or both creating the model and controlling the pressure regulating system comprises taking into account at least one inlet pressure value determined by at least one inlet pressure sensor of the one or more pressure sensors, the at least one inlet pressure sensor being arranged at an inlet side of the pressure regulating system.

20. The method according to claim 15, further comprising updating the model continuously, regularly or sporadically before, during or after operation of the pressure regulation system based on changes in the at least one remote pressure value or based on changes in the at least one load-dependent variable or based both on changes in the at least one remote pressure value and changes in the at least one load-dependent variable.

21. The method according to claim 15, wherein creating the model or controlling the pressure regulating system or both creating the model and controlling the pressure regulating system comprises taking into account at least one first section pressure value determined by at least one first section pressure sensor of the one or more pressure sensors, the at least one first section pressure sensor being arranged in a first section of the water supply network, and at least one second section pressure value determined by at least one second section pressure sensor of the one or more pressure sensors, the at least one second section pressure sensor being arranged in a second section of the water supply network, wherein the first and the second sections of the water supply network differ from each other and are arranged downstream of the pressure regulating system.

22. The method according to claim 21, wherein:
the model represents a first pressure control parametrization for the first section and a second pressure control parametrization for the second section;
creating the model or updating the model or both creating and updating the model comprises determining a first pressure demand from the first pressure control parametrization and a second pressure demand from the second pressure control parametrization based on the load-dependent variable; and
controlling the pressure regulating system comprises controlling the pressure regulating system according to the higher of the first pressure demand and the second pressure demand.

23. The method according to claim 15, further comprising:
updating the model continuously, regularly or sporadically;
comparing a previous or pre-determined pressure control parametrization with an updated pressure control parametrization for a given load-dependent variable; and
identifying a leakage in the water supply network or identifying a blockage in the water supply network or identifying both a leakage and a blockage in the water supply network based on comparing the previous or pre-determined pressure control parametrization with an updated pressure control parametrization.

24. The method according to claim 15, wherein:
controlling the pressure regulating system comprises keeping at least one critical pressure value above a pre-determined threshold value; and
the at least one critical pressure value is determined by at least one critical pressure sensor of the one or more pressure sensors, the at least one critical pressure sensor being arranged in a critical pressure section of the water supply network.

25. The method according to claim 15, further comprising storing one or more of the at least one remote pressure value or storing the at least one load-dependent variable or storing both the at least one remote pressure value and the at least one load-dependent variable at one or more different points in time.

26. The method according to claim 15, further comprising receiving continuously, regularly or sporadically data comprising one or more of the at least one remote pressure value or data comprising the at least one load-dependent variable or data comprising both one or more of the at least one remote pressure value and the at least one load-dependent variable, said data being stored at one or more different points in time in at least one data storage of the one or more pressure sensors.

27. The method according to claim 15, wherein the model comprises a day time dependency of the necessary outlet pressure.

28. A method of controlling a pressure regulating system of a supply network, the method comprising the steps of:
providing a pressure sensor at a location of the water supply network remotely spaced from the pressure regulating system;
measuring a pressure value from the pressure sensor;
measuring a load-dependent variable of the pressure regulating system;
creating a function for controlling the supply network on the basis of the pressure value and the load-dependent variable, said creating of the function being independent of measured, determined or estimated flow values;
controlling the pressure regulating system based on the function.

* * * * *